United States Patent
Cusson et al.

(10) Patent No.: US 10,125,506 B2
(45) Date of Patent: Nov. 13, 2018

(54) CONCRETE FORM SYSTEM FOR BALLAST FOUNDATIONS

(71) Applicant: Northern States Metals Company, Youngstown, OH (US)

(72) Inventors: Paul R. Cusson, West Hartford, CT (US); Gregory P. Huzyak, Salem, OH (US); Nathan A. Knapp, Vienna, OH (US)

(73) Assignee: Northern States Metals Company, West Hartford, CT (US)

( * ) Notice: Subject to any disclaimer, the term of this patent is extended or adjusted under 35 U.S.C. 154(b) by 93 days.

(21) Appl. No.: 15/364,839

(22) Filed: Nov. 30, 2016

(65) Prior Publication Data

US 2017/0159318 A1 Jun. 8, 2017

Related U.S. Application Data

(60) Provisional application No. 62/264,658, filed on Dec. 8, 2015.

(51) Int. Cl.
| | |
|---|---|
| *E04G 9/06* | (2006.01) |
| *E04G 9/08* | (2006.01) |
| *E02D 27/08* | (2006.01) |
| *E02D 27/42* | (2006.01) |
| *F24S 25/11* | (2018.01) |
| *E04G 13/02* | (2006.01) |
| *F24S 25/12* | (2018.01) |
| *H02S 20/10* | (2014.01) |

(52) U.S. Cl.
CPC .............. *E04G 9/083* (2013.01); *E02D 27/08* (2013.01); *E02D 27/42* (2013.01); *E04G 9/06* (2013.01); *E04G 13/02* (2013.01); *F24S 25/11* (2018.05); *F24S 25/12* (2018.05); *H02S 20/10* (2014.12)

(58) Field of Classification Search
CPC ..... E04H 12/2246; E02D 27/08; E02D 27/42; E02D 27/013; E04G 9/083; E04G 9/06; E04G 13/00; E04G 13/02; F24S 25/11; F24S 25/12; F24S 2025/02; H02S 20/10; Y02E 10/47; Y10T 29/49355; F24J 2002/5292

See application file for complete search history.

(56) References Cited

U.S. PATENT DOCUMENTS

| | | | |
|---|---|---|---|
| 3,148,444 A | * | 9/1964 | Stark ........................ E04B 5/326 29/455.1 |
| 4,017,051 A | | 4/1977 | Scott et al. |
| 4,306,397 A | | 12/1981 | Rarnseyer |
| 4,624,615 A | | 11/1986 | Russell et al. |
| 4,669,240 A | | 6/1987 | Amormino |

(Continued)

FOREIGN PATENT DOCUMENTS

FR    2991704 A1 * 12/2013 ............... E04G 9/08

*Primary Examiner* — Adriana Figueroa
*Assistant Examiner* — Jessie T Fonseca
(74) *Attorney, Agent, or Firm* — Roth, Blair, Roberts, Strasfeld & Lodge, L.P.A.

(57) ABSTRACT

A ballast foundation includes a portable rolled steel enclosure formed from multiple sections and further includes internal bracing. The internal bracing is used to support an upright vertical structural member that connects to an external load (such as a frame structure for a solar array) that is supported by the ballast foundation when the enclosure is filled with concrete.

10 Claims, 14 Drawing Sheets

(56) References Cited

U.S. PATENT DOCUMENTS

| | | |
|---|---|---|
| 4,817,353 A | 4/1989 | Woods et al. |
| 4,924,641 A | 5/1990 | Gibbar, Jr. |
| 4,972,641 A | 11/1990 | Barrios |
| 4,984,401 A | 1/1991 | Baldino |
| 5,086,847 A | 2/1992 | Meiners |
| 5,380,122 A | 1/1995 | Rambo et al. |
| 5,392,573 A | 2/1995 | Gould |
| 5,531,419 A | 7/1996 | Gustafsson et al. |
| 5,586,417 A | 12/1996 | Henderson et al. |
| 5,778,608 A | 7/1998 | Elliott, Jr. |
| 5,826,387 A | 10/1998 | Henderson et al. |
| 5,843,323 A | 12/1998 | Renard |
| 5,865,001 A | 2/1999 | Martin et al. |
| 6,003,278 A | 12/1999 | Weaver et al. |
| 6,408,581 B2 | 6/2002 | Monachino |
| 6,568,136 B2 | 5/2003 | Aso |
| 6,581,898 B2 | 6/2003 | McCracken |
| 6,739,102 B2 | 5/2004 | Roy, Sr. |
| 6,865,859 B2 | 3/2005 | Flathau |
| 7,497,059 B2 | 3/2009 | Bennett |
| 7,832,174 B2 | 11/2010 | Way |
| 8,074,414 B2 | 12/2011 | Carrion et al. |
| 8,161,698 B2 | 4/2012 | Migliore |
| 8,443,562 B2 | 5/2013 | Paul et al. |
| 8,631,616 B2 | 1/2014 | Carrion et al. |
| 8,839,593 B2 | 9/2014 | Barrett et al. |
| 2004/0056169 A1* | 3/2004 | Harbaugh ............ E04H 12/2246 248/519 |
| 2008/0035831 A1* | 2/2008 | Rodin .................... E02D 27/42 249/25 |
| 2010/0257794 A1 | 10/2010 | Stark |
| 2013/0087186 A1 | 4/2013 | Pelman |
| 2014/0059957 A1 | 3/2014 | Stark |
| 2014/0166848 A1* | 6/2014 | Hunt .................... E02D 27/013 249/1 |
| 2014/0182663 A1* | 7/2014 | Kuo .................... H01L 31/0422 136/251 |
| 2015/0034575 A1* | 2/2015 | Warpup .................. H02S 20/10 211/41.1 |
| 2015/0136205 A1 | 5/2015 | Worden |
| 2015/0200619 A1* | 7/2015 | Worden ................. H02S 20/10 136/251 |

* cited by examiner

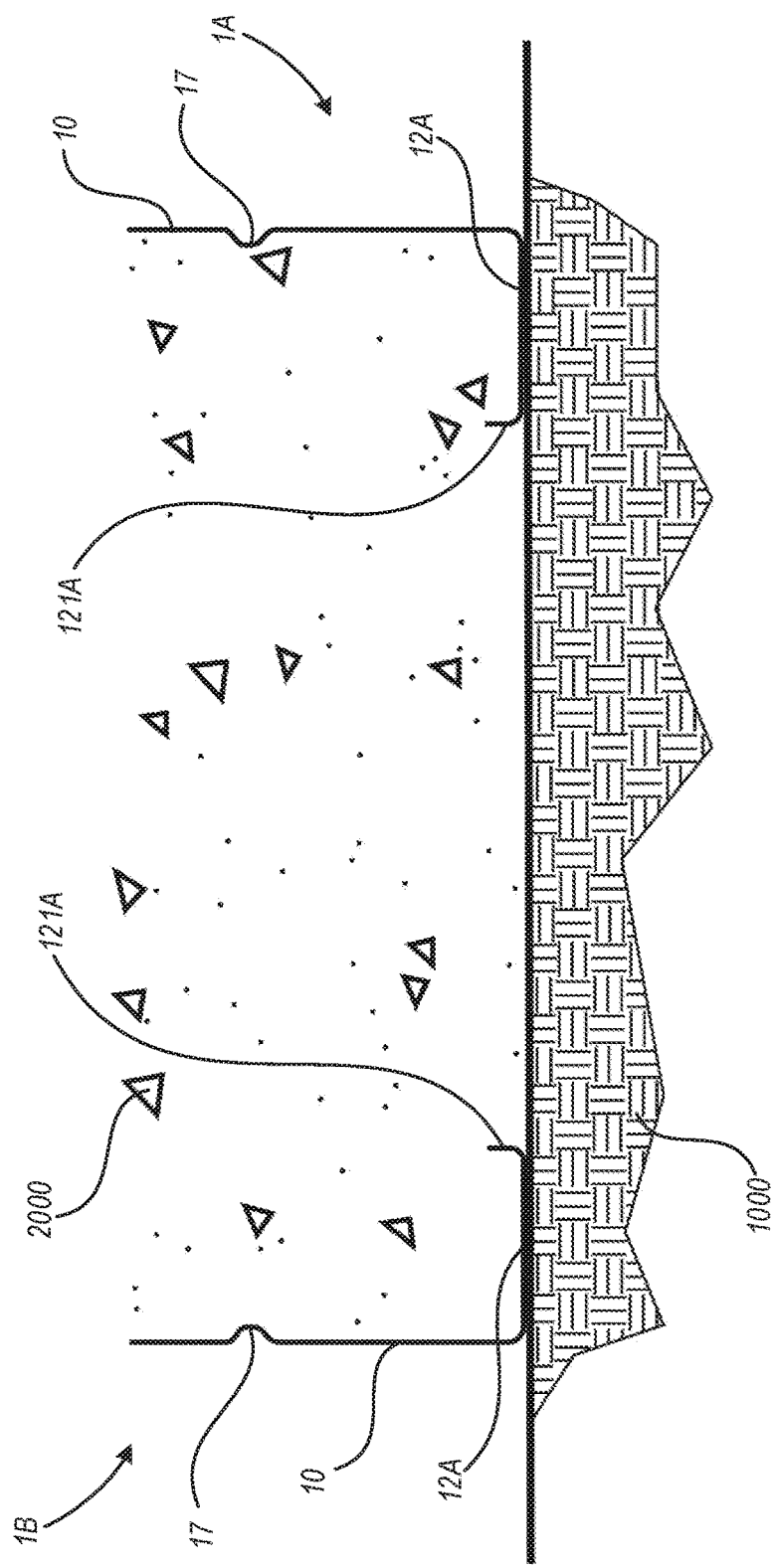

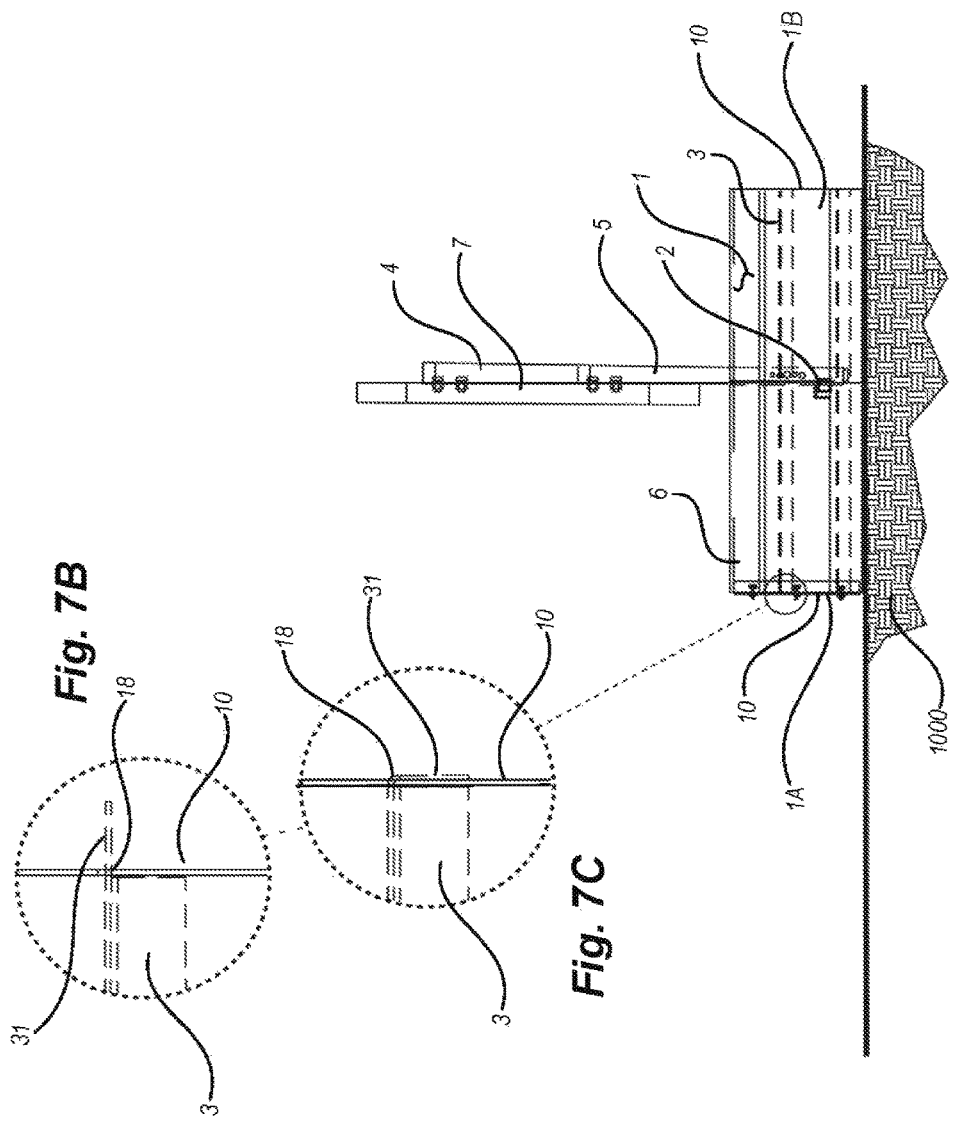

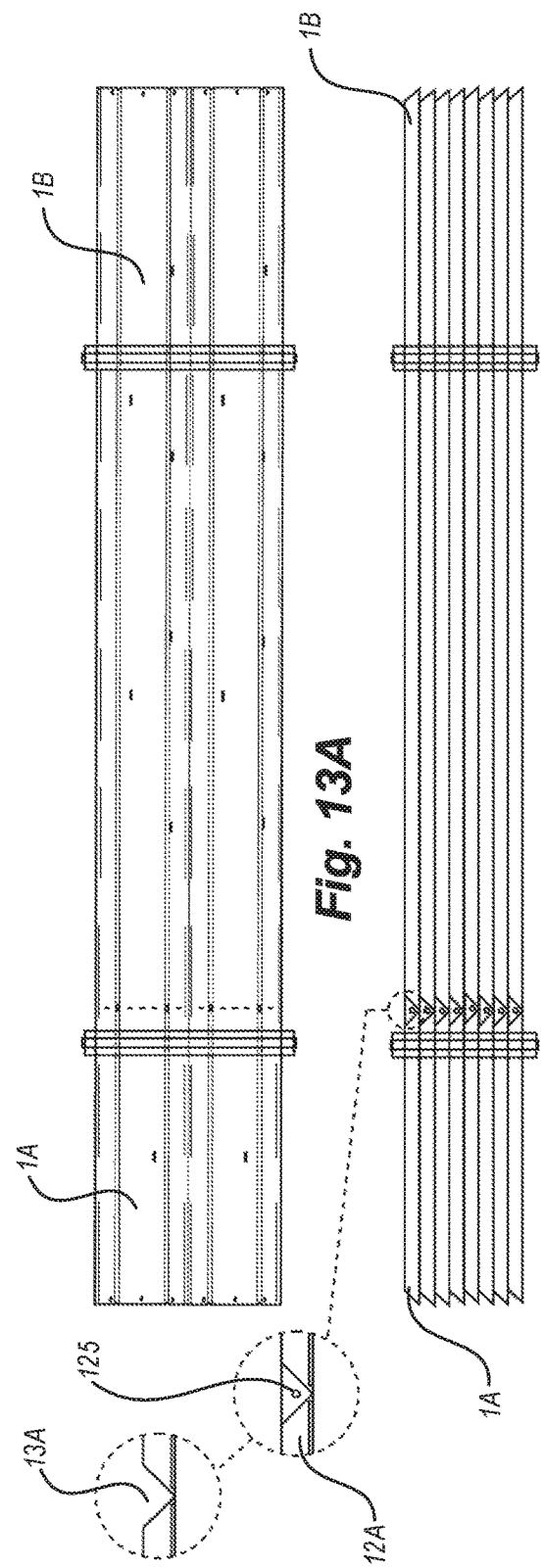

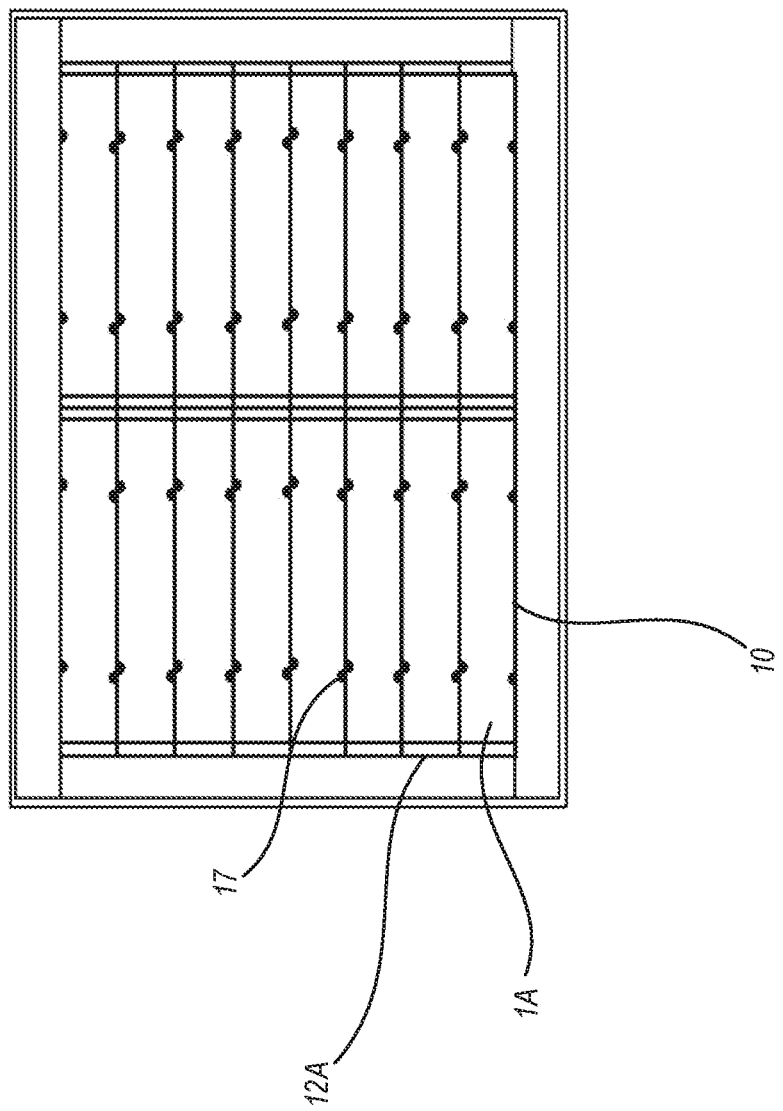

CONCRETE FORM SYSTEM FOR BALLAST FOUNDATIONS

PRIORITY DATA

This application claims priority to U.S. Provisional Patent Application No. 62/264,658 filed Dec. 8, 2015, which is incorporated herein in its entirety.

FIELD OF INVENTION

The present invention is generally related to concrete form systems. In particular, the present invention is directed to an internally-braced concrete form system for ballast foundations.

BACKGROUND

Foundations which are used to support surface structures of many types, are preferably formed by substantial amounts of excavation to interface the foundation with the substrate, and provide stability. This is important for both the stability of the foundation and any structures supported thereby. However, there are a number of situations in which conventional excavation is impossible or not appropriate.

In such situations, structures known as ballast foundations must be used. These are foundations that support their overlying structures by virtue of the mass of the foundation resting upon the surface of the substrate (such as the underlying ground, pavement, structure, or the like) to provide stability to the structure supported thereon.

In many situations, concrete foundations are poured to have a large "footprint". These foundations are often very shallow, being only a few inches in thickness. In some situations, multiple foundation structures are connected together for stability with elaborate superstructure configurations. Very often shallow ballast foundations are stabilized with external anchors driven into the substrate around the ballast foundation.

Unfortunately, there are a number of situations in which large footprints are inappropriate. One example is when there is an extremely uneven substrate contour. Further, in many circumstances it is inappropriate to excavate, even if only to drive relatively small anchors into the substrate around ballast foundations. One example of such circumstances includes landfills upon which structures are to be placed. In landfills, structures are typically anchored without excavating, or otherwise disturbing the underlying earth or substrate.

In some circumstances, the substrate surface is not flat, but the concrete pour of the ballast foundation must still conform to the topography of the underlying substrate. In order to provide proper support for various structures, the ballast foundations must be configured so as to provide the necessary support at any part of the substrate to be utilized.

One solution to the aforementioned problems is the use of precast ballast foundations which are manufactured (including the metal supports extending from the concrete pour) at another location and then transported to the site at which the structure is to be placed on the foundation. However, as efficient as this solution may appear to be, there are substantial drawbacks. In particular, transporting ballast foundations to the final support site may be impractical due to the fragility of the substrate (such as with the covering at a landfill). This is particularly problematic if large ballast foundations are required to support the structure to be mounted. The necessary handling equipment, such as large cranes, may not be able to traverse the substrate upon which the ballast foundations are to be placed. Moreover, this is especially true in situations such as landfills covered with relatively fragile turf. To be clear, if the structure to be mounted on the ballast foundation is to be located on a site where the substrate is still settling, or is subject to various types of environmental degradation, there may not be an appropriate place to safely put precast ballast foundations.

Further yet, the exact placement upon the construction site may be difficult so that propositioned metallic supports placed in the concrete may be inappropriately positioned for the structure to be supported. This is exacerbated by changes in the substrate covering a landfill for example, which might make repositioning of the overall supported structure necessary. Metallic extensions, such as vertical support structures, in precast ballast foundations may prove to be impossible to use due to inexact measurements taken before precasting or due to environmental changes. Once metallic supports are precast in concrete, they cannot be altered to accommodate changes at the job site.

Accordingly, concrete form system for ballast foundations, that can be assembled on-site and will allow adaptation to various types of substrate without excavation, is needed. In many situations, it is far easier to run a tube carrying liquid concrete from another location (more stable) to the site at which the ballast foundation is required. The resulting ballast foundation erected on-site must be sufficiently stable to support relatively heavy and unstable upper structures. The form system must be easy to ship and assemble, and should be adaptable to a wide range of foundation requirements.

SUMMARY OF THE INVENTION

Accordingly, it is a primary object of the present invention to provide a concrete form system to fabricate concrete ballast foundations suitable for a wide variety of different substrates and environments, without excavation of the substrate.

It is another object of the present invention to provide a concrete form system that is internally braced to be self-supporting.

It is an additional object of the present invention to provide a concrete form system with adjustable vertical structural supports.

It is a further object of the present invention to provide a ballast foundation concrete form system that is easily transportable in a compact package and can easily be assembled on-site for a concrete pour.

It is still another object of the present invention to provide a metal ballast foundation concrete forms system that is easily manufactured while still providing a sufficiently robust structure to withstand forces generated by large concrete pours.

It is yet an additional object of the present invention to provide a ballast foundation concrete form system that is easily transported and safely assembled at remote pour sites.

It is again a further object of the present invention to provide a ballast foundation concrete form system that is easily configurable and assembled on-site, while being designed for optimal nesting and stacking for transportation.

It is again another object of the present invention to provide a ballast foundation concrete form system that is inexpensive, simple to manufacture, transport and assemble on-site.

It is still a further object of the present invention to provide a ballast foundation concrete form system that admits to a wide variety of different internal bracing configurations for a wide range of ballast foundation sizes and uses.

It is yet an additional object of the present invention to provide a ballast foundation concrete form system that is easily manufactured to specific ballast foundation requirements so that the proper amount of concrete is always used to provide the weight for a specified load on the substrate beneath the ballast foundation.

These and other goals and objects of the present invention are achieved by a ballast foundation system constituted by interacting portable parts configured to a substrate underlying the ballast foundation system. The ballast foundation system in this case preferably includes at least two folding metallic casing sections arranged together to enclose a space over the substrate. The metallic casing sections are configured in two sets of attached opposing walls. A bracing configuration is arranged internal to the metallic casing sections and includes at least one longitudinal cross brace locked to the first set of opposing walls, a plurality of transverse cross braces, each attached to the longitudinal cross brace and locked to a second set of opposing walls. Also included is at least one upright vertical support attached to the longitudinal cross brace and to at least one of the transverse cross braces. A concrete pour is arranged within the metallic casing sections where the concrete pour conforms to the substrate underlying the ballast foundation system and rises no higher than the vertical height of the opposing walls of the metallic casing.

In another embodiment of the present invention, a ballast form is arranged to be placed on a substrate at the construction site. The ballast form includes two metal sheets each having a length, with a flat outer surface. Each of the sheets includes at least one V-notch at opposing edges along the length of the sheet, and creases across the width from the V-notch for bending to form an enclosure by connecting both metal sheets on-site on the substrate. The enclosure has first and second sets of parallel sidewalls once assembled. A bracing system is arranged inside the enclosure and includes at least one longitudinal cross brace and a plurality of transverse cross braces within the enclosure secured to the first and second sets of sidewalls. More specifically, the longitudinal cross brace is secured to the first set of sidewalls and each of the transverse cross braces is secured to the longitudinal cross brace and to the second set of parallel sidewalls. At least one substantially vertical support is placed within the enclosure and is also attached to the longitudinal and transverse cross braces. Concrete is poured and contained within the braced enclosure above the substrate, and is no thicker than the width of the metal sheets.

Another embodiment of the present invention includes a process for building a ballast foundation on-site wherein the process includes the manufacture of a plurality of enclosure sections of steel (i.e., each of the enclosure sections being formed, notched and scored using a single sheet of steel). Next, a plurality of the enclosure sections are stacked and shipped on a transport vehicle to at least one predetermined insulation site. Then, at least two of the enclosure sections are removed from the transport vehicle at a first predetermined installation site. The two enclosure sections are folded and placed together to form an enclosure. The enclosure is internally braced with at least one longitudinal brace and a plurality of transverse cross braces. The bracing is locked to the enclosure by locking tabs extending through slots in the enclosure. Then, at least one substantially vertical upright support is attached and adjusted to the desired vertical angle. Finally, concrete is poured into the enclosure to form a single integrated permanent ballast foundation from the enclosure with proper bracing and the substantially vertical upright support extending therefrom.

BRIEF DESCRIPTION OF THE DRAWINGS

FIG. 6 is a cross-sectional view of the bottom portions of two opposing form sections arranged in parallel to each other on a substrate.

FIG. 7A is an end view of the structure depicted in FIG. 1.

FIG. 7B is an enlarged view of a portion of the structure in FIG. 7A, with a connecting flange of a brace depicted in the extended position passing through the form section sidewall.

FIG. 7C is a depiction of FIG. 7B, with the connecting flange bent to secure the brace in position to the form section sidewall.

FIG. 13A is a top view of the subject concrete forms arranged and packaged for shipping.

FIG. 13B is a side elevational view of the packaged forms of FIG. 13A.

FIG. 13C is an end view of the packaged concrete forms depicted in FIG. 13B.

DESCRIPTION OF THE PREFERRED EMBODIMENTS

Figure 1:
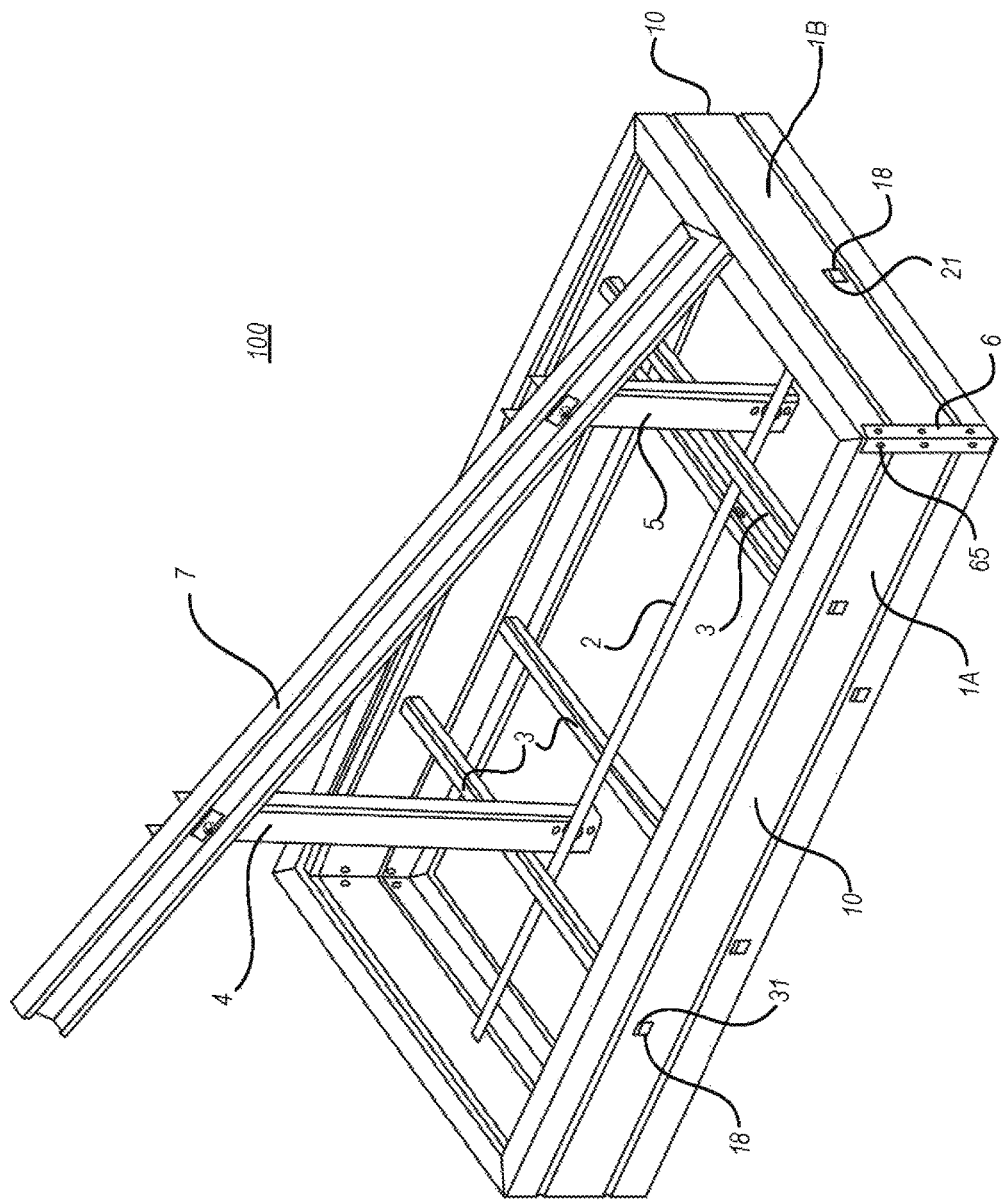
FIG. 1 is a perspective view of the assembled system configured for a concrete pour.

FIG. 1 is a perspective view depicting a single use ballast concrete form system 100 of the present invention. The system, as depicted, is configured to serve as a support with tilt bracket for framing for a solar panel array. However, the present invention need not be limited to support of solar panel arrays. The rear and front vertical supports 4, 5 can be modified in a variety of ways to support any kind of structure that requires a ballast foundation. External bracing or supports such as a tilt top cord 7 can also be modified as necessary for the structure to be supported by ballast form system 100.

While FIG. 1 depicts two vertical supports 4, 5, sized so that the top tilt cord 7 is at a particular angle, a wide variety of different vertical supports can be used within the concept of the present invention. Further, those supports can be of any size or height consistent with the structure to be supported and the concrete pour to be contained within form system 100. For example, only a single vertical support can be used in some applications while more than two vertical supports can be provided for other types of applications.

Likewise, while four transverse cross braces 3 are depicted in FIG. 1, form system 100 can be modified to accommodate a greater or lesser number of transverse cross braces to accommodate the size of the resulting ballast foundation and the size of concrete pour 2000 (FIG. 6). Further, while U-shaped channels are used as vertical supports in FIG. 1, different types of structures can be used as vertical supports to accommodate the requirements of the structure to be supported. Also, while top tilt cord 7 is provided to help support a solar panel array, other types of supports or external bracing can be used. Because of the capability, described infra., regarding the adjustments and bracing of the vertical supports 4, 5, external bracing (such as the use of top tilt cord 7) may not be necessary before providing the concrete pour 2000.

Because the form sections 1A, 1B are rolled sheet steel, they are easily manufactured in different sizes to accommodate different ballast support requirements. These forms can be anywhere from 6 inches to several feet in height. The taller form arrangements will require additional internal cross bracing to properly contain the forces generated by concrete pour 2000. Additional slots 18 are easily added during the manufacturing process of form sections 1A, 1B to accommodate bracing for greater heights. This allows the present form system 100 to be easily modified during the manufacturing process, and easily provided with additional internal bracing during the assembly process.

Further, the height, length and width (overall finished footprint) of the form can easily be modified by manufacturing the forms in varying lengths. This is a simple way in which to increase the strength of the resulting ballast foundation. The requirements for the load of the ballast foundation can be calculated in a manner that will permit an exact calculation as to the length of the form sections based upon a particular height of the form sections. All that need be done is that the concrete pour be applied to the very top of the form system 100 when assembled, so that the requirements of the ballast foundation are met without further adjustment at the pour site.

The benefit of this is that the ballast foundation requirements (for a particular type of load) are easily accommodated by simply adjusting the length of the form sections 1A, 1B during the manufacturing process. The resulting manufacturing, packing, shipping, assembly and pour steps of the process are thereby simplified substantially.

Figure 2:
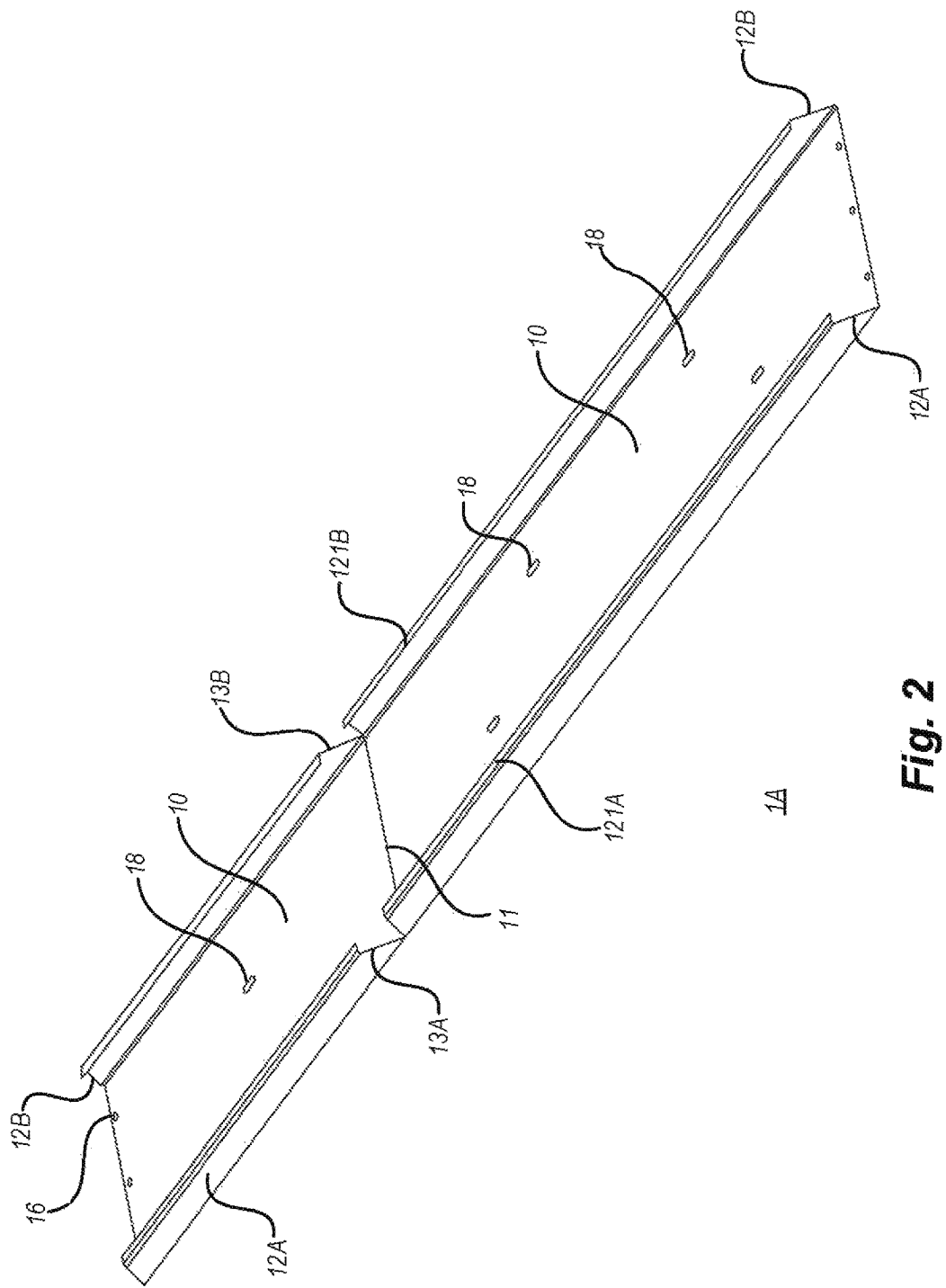
FIG. 2 is a perspective view of a single form section as manufactured.

The form system 100 is preferably constituted by two substantially identical sections 1A, 1B, as depicted in FIG. 1. A single form section 1A, for example, is depicted in FIG. 2. Form section 1A is flat, which is the configuration in which it is manufactured, and shipped. This flat arrangement simplifies shipping because nesting and stacking of the various form sections is possible, as depicted in FIGS. 13A-13C.

Both form sections 1A, 1B have a sidewall 10 with a number of fastener apertures 16 (to accommodate screws), and fastener slots 18 to accommodate the flanges of the internal cross bracing 2, 3. Sidewall 10 is bounded on its width by transverse edges 12A, 12B best seen in FIG. 2. At scored crease or pre-seam 11, both transverse edges 12A, 12B are provided with a V-notch 13A, 13B. Each of the transverse edges 12A, 12B includes a lip structure 121A, 121B, respectively. These lip structures 121A, 121B can be discontinued at the V-notch structures 13A, 13B.

Each form section 1A, 1B is preferably made of rolled sheet metal. This particular kind of construction is less expensive for the type of structure shown in the drawings since the form sections 1A, 1B are more easily and inexpensively manufactured using rolled sheet metal. Further, this particular configuration aids in the transportation of the form sections 1A, 1B since these structures are easily nested and/or stacked during transportation.

The rolled sheet metal form sections 1A, 1B are able to withstand the pressure of a large concrete pour 2000 due to a number of factors. The sidewalls 10 are stiffened by the transverse edges 12A, 12B, and further by the lip structures 121A, 121B extending substantially perpendicular to the respective transverse edges. As a result, there is far less inclination for the sidewalls 10 to bulge outward under the stresses created by a concrete pour 2000.

Figure 3:
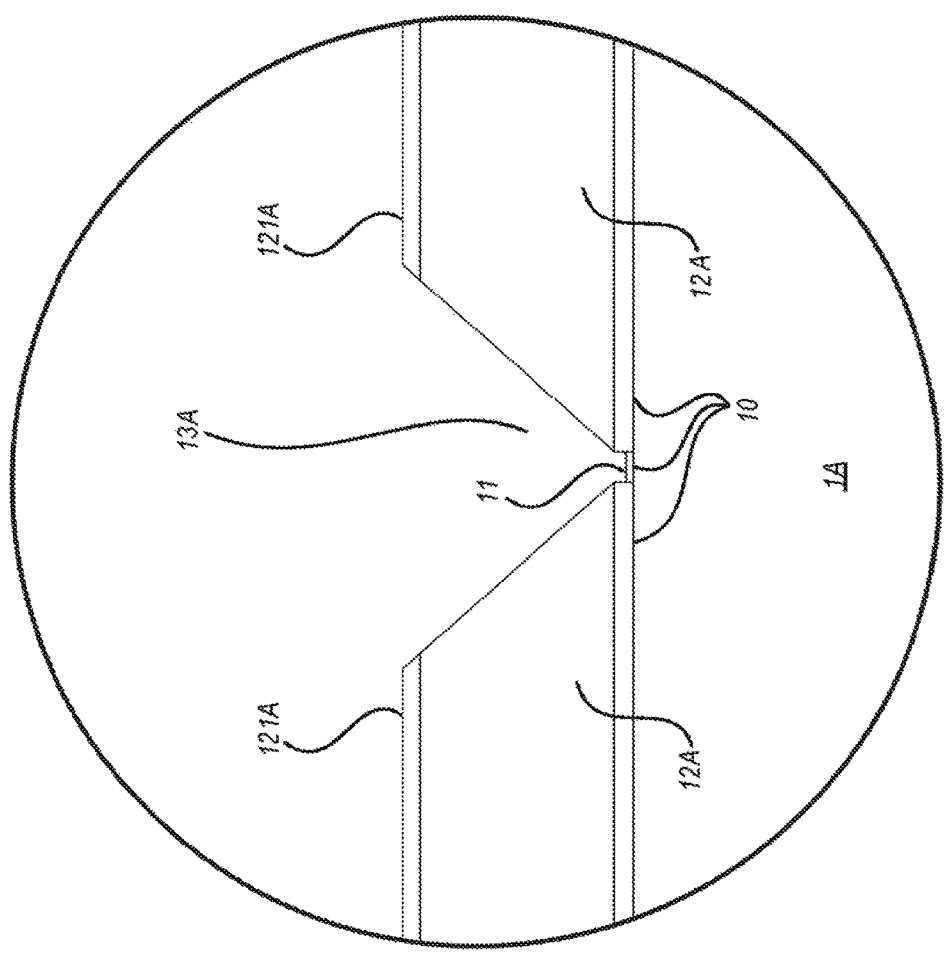
FIG. 3 is a magnified side view of the V-notch portion of a concrete form section, in a configuration suitable for bending at installation.

FIG. 3 depicts an enlarged view of the V-notch such as 13A, 13B. The subject V-notches result when a knock-out 125 (in FIG. 13B) is removed after transport. Then, form sections 1A, 1B can be folded at pre-seam or crease 11. It is relatively easy to manufacture form sections 1A, 1B with knock-outs 125 at each of the V-notches 13A, 13B to keep transverse edges 12A, 12B contiguous so as to remain robust during transport. The structure of the transverse edges 12A, 12B can be configured so that knock-outs 125 are easily removed after transport.

Figure 4:
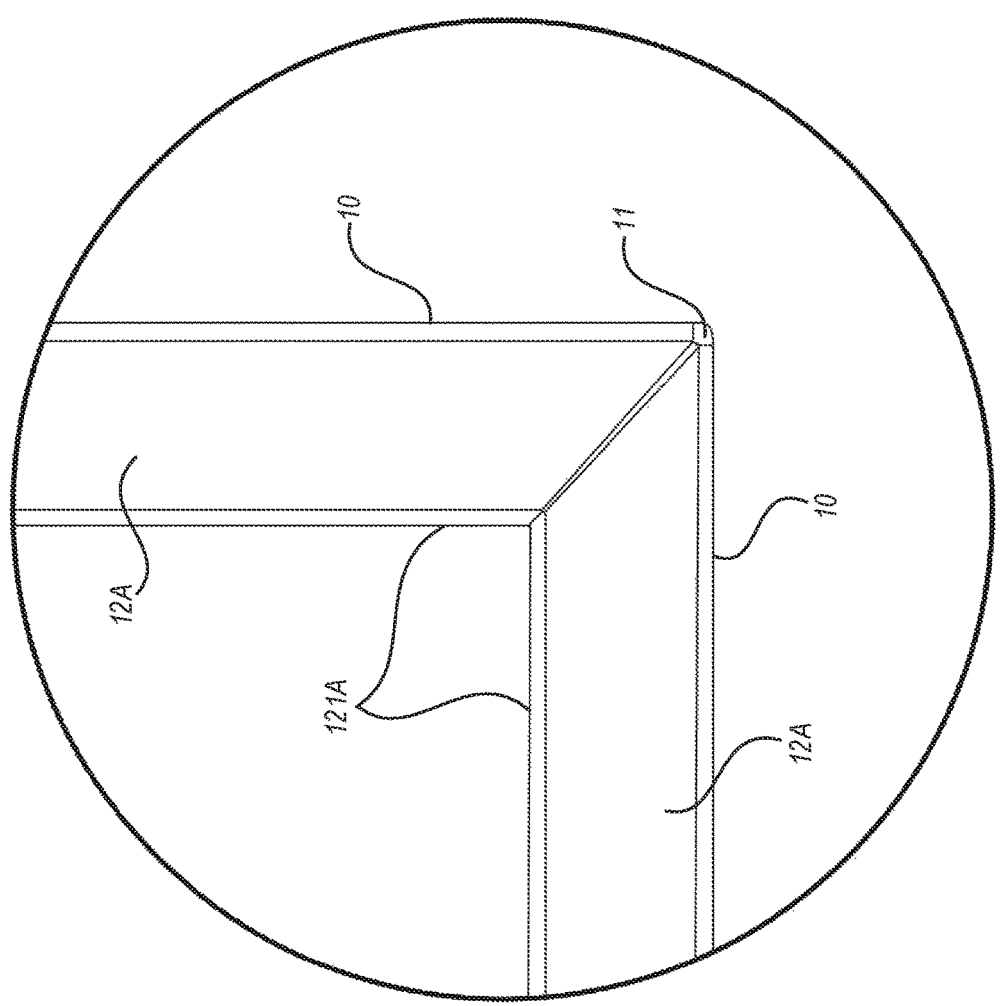
FIG. 4 depicts the same structure as FIG. 3, but with the form section bent and configured for assembly, such as that depicted in FIG. 1.
Figure 5:
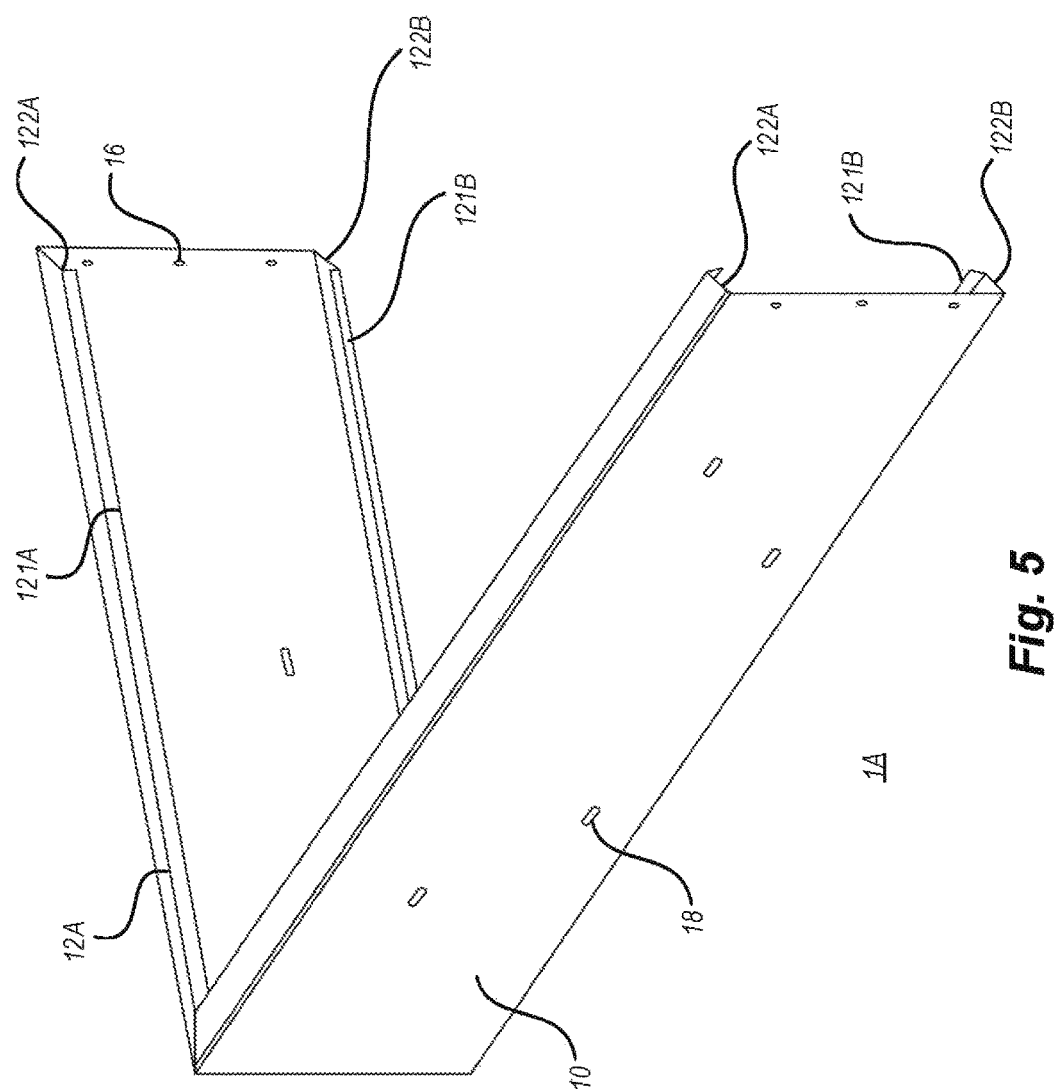
FIG. 5 is a perspective view of a single form section bent and arranged for assembly with another form section (not shown).

When a form section, such as 1A, 1B, is folded at the scored crease 11, the V-notch 13A, 13B permits the transverse edges 12A, 12B, to come together as depicted in FIG. 4B and FIG. 5. Each form section 1A, 1B now forms an L-shape as depicted in FIG. 5. Because opposing ends of transverse edges 12A, 12B come together at the fold, they strengthen the overall structure.

Additional strength is provided to each of the form sections 1A, 1B by virtue of the fact that each form section forms two sides of the overall concrete form system 100. Two such form sections 1A, 1B are connected together after each has been folded along crease 11. The two intersections between the two form sections 1A, 1B, are connected together using corner braces 6 seen in FIGS. 1 and 11, which are connected using screws or other fasteners to sidewalls 10 of each of the forms sections 1A, 1B.

Figure 11:
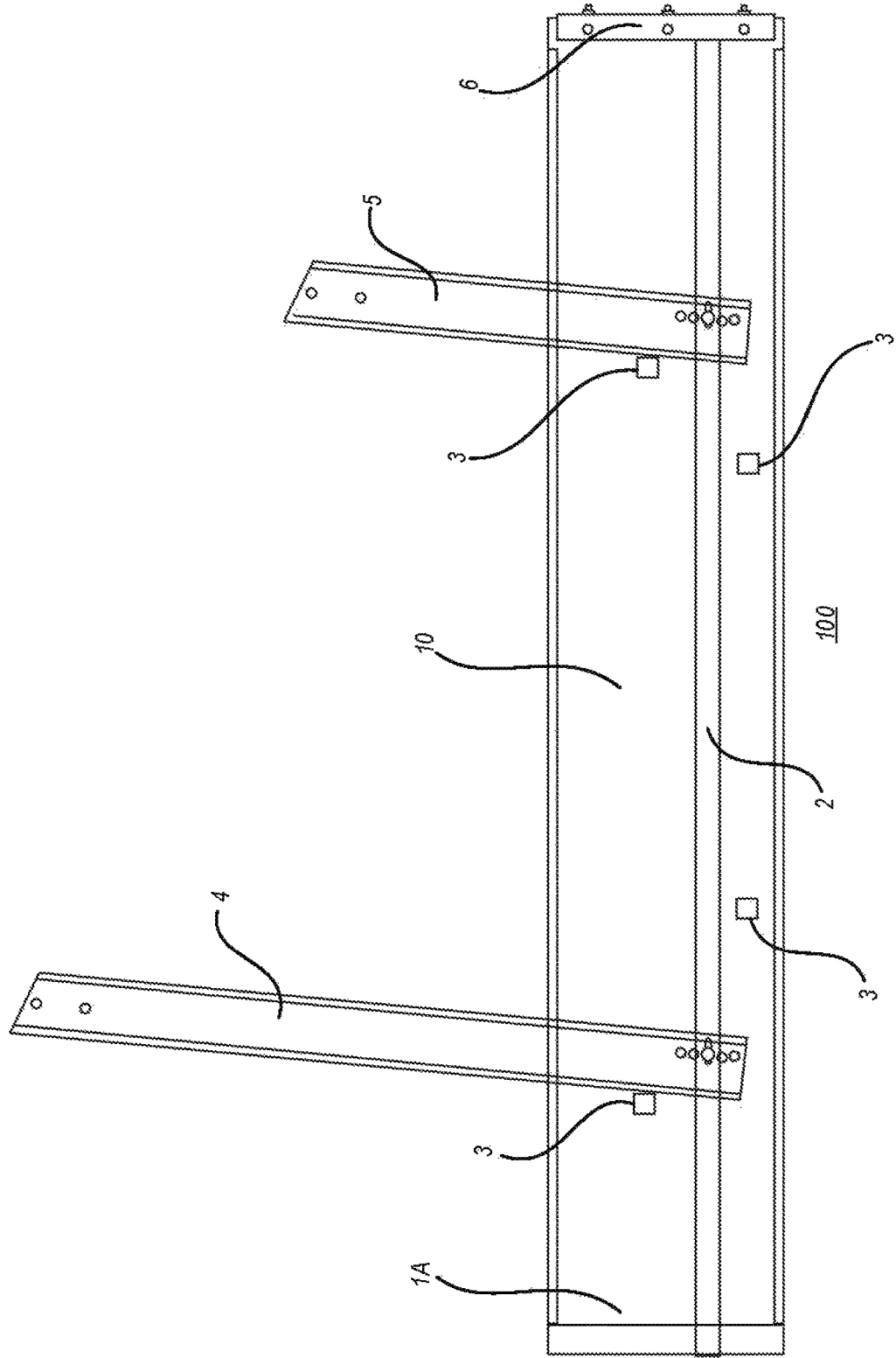
FIG. 11 is a side elevational view depicting the tolerances in a first direction for positioning of the vertical supports with respect to internal cross bracing.

Additional strength can come from ribs 17, as depicted in FIG. 6, to provide additional stiffness to sidewalls 10 of the form sections 1A, 1B. Ribs 17 are easily formed within the body of the sidewalls 10 through the rolling process used to create the overall form sections 1A, 1B. FIG. 6 depicts a cutaway view of parts of two parallel form sections 1A, 1B. Only the lower portions of the form sections are depicted, being supported by substrate 1000. Also depicted is concrete pour 2000, applied between the two form sections 1A, 1B. It is well-known that substantial force is generated by concrete pour 2000, tending to force the form sections 1A, 1B outward, or otherwise distort the concrete form sections. This is addressed cumulatively by ribs 17, transverse edges 12A, 12B and lip structures 121A, 121B. All of these, in conjunction with the corner brace 6 connecting the two L-shaped structures (one of which is depicted in FIGS. 1 and 11) to form the concrete form system 100 of FIG. 1, help to address the issue of pressure generated by concrete pour 2000. However, these expedients are not necessarily sufficient in themselves. This is especially true when fabricating large concrete foundation form systems 100.

It is well-known that concrete structures benefit from reinforcement, such as metal bars ("rebar") or meshes placed within the concrete pour. The current form system 100 provides such reinforcement, both for strengthening the concrete product, and holding the form system 100 together under the pressures generated by concrete pour 2000. To provide additional bracing, longitudinal cross brace 2 is provided, along with transverse cross braces 3. It should be noted that there are 4 transverse braces 3 in the form system 100 depicted in FIGS. 1 and 11, and that the transverse cross braces 3 are arranged at two different heights between the sidewalls 10 of form sections 1A and 1B. There are also connections between the longitudinal cross brace 2, transverse cross braces 3, and front and rear vertical supports 4, 5, as seen for example in FIGS. 8A, 8B and 9. All of these structures, which are almost entirely internal to the form system 100, are eventually held within concrete pour 2000, bracing the resulting concrete ballast structure.

While four transverse cross braces 3 and one longitudinal cross brace 2 are depicted in FIGS. 1 and 11, additional bracing of both types can be provided. Further, there can be greater or fewer transverse cross braces 3 than the arrangement depicted in the Figures. The internal cross bracing 2, 3 of the form system 100 can be arranged in a manner that will help support additional concrete reinforcing structures (not shown), such as metal mesh, rebar, and the like. However, it should be understood that the primary purpose of the longitudinal and transverse cross bracing 2, 3 is to maintain strength and stability of the overall form system 100 during a concrete pour.

The internal cross bracing 2, 3 is connected to opposite sidewalls 10 of form sections 1A, 1B, by means of slots 18 in the sidewalls of each of the form sections. FIG. 7A depicts an end view of the arrangement of FIG. 1. Transverse cross braces 3 are connected to opposite sidewalls 10 of parallel form sections 1A, 1B. In FIG. 7B flanges 31 at each end of transverse cross braces 3 extend through slots 18 in sidewalls 10. In FIG. 7B, flanges 31 are depicted in the non-secure position. In FIG. 7C, flanges 31 have been bent against sidewall 10, thereby securing the sidewall 10 to transverse cross brace 3. The same can be done with respect to longitudinal cross brace 2, which is also constructed so that flanges 21 extend from each end of longitudinal cross brace 2. This is done in the same manner as the transverse cross braces 3. Accordingly, the internal bracing of the form system 100 is accomplished in a simple, effective manner which holds sidewalls 10 in a fixed position, so as not to be deformed by concrete pour 2000.

Further, as previously described, reinforcement is provided at the interfaces of the two complementary form sections 1A, 1B. The reinforcement is provided by corner braces 6, which have apertures 61 aligned with apertures 16 in the sidewalls 10 of each of the form sections 1A, 1B. Preferably, fasteners, such as screws 65, are used to hold the edges of the complementary form sections 1A, 1B together. In order for this to be accomplished, there is an incline cut 122A, 122B in the transverse edges at the two ends of each form section 1A, 1B as shown in FIG. 5. The two incline edges of complementary form sections will butt up to each other so that complementary form sections 1A, 1B can fit together as depicted.

Front and rear vertical supports 4, 5 are necessary for connection to the structure, or structures that are to be supported by the ballast foundation resulting from the concrete pour 2000 in form system 100. It should be understood that within the context of the present invention, two vertical supports 4, 5 (as depicted in the drawings) are not necessary. Rather, a single vertical support could be used, or more than two could also be used within the context of the present invention. The drawings depict a concrete form system 100 specifically arranged to support framing for a solar panel array. Consequently, tilt top cord 7 is also an essential part of the solar panel array support frame and at least two ballast foundations will be required for the solar panel array.

Figure 8B:
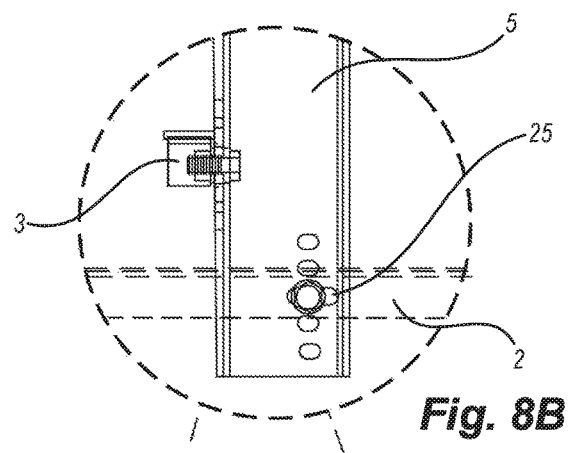
FIG. 8B is an enlarged diagram of two identical portions of the structure of FIG. 8A, depicting connections between transverse and longitudinal cross braces, and vertical supports.
Figure 8A:
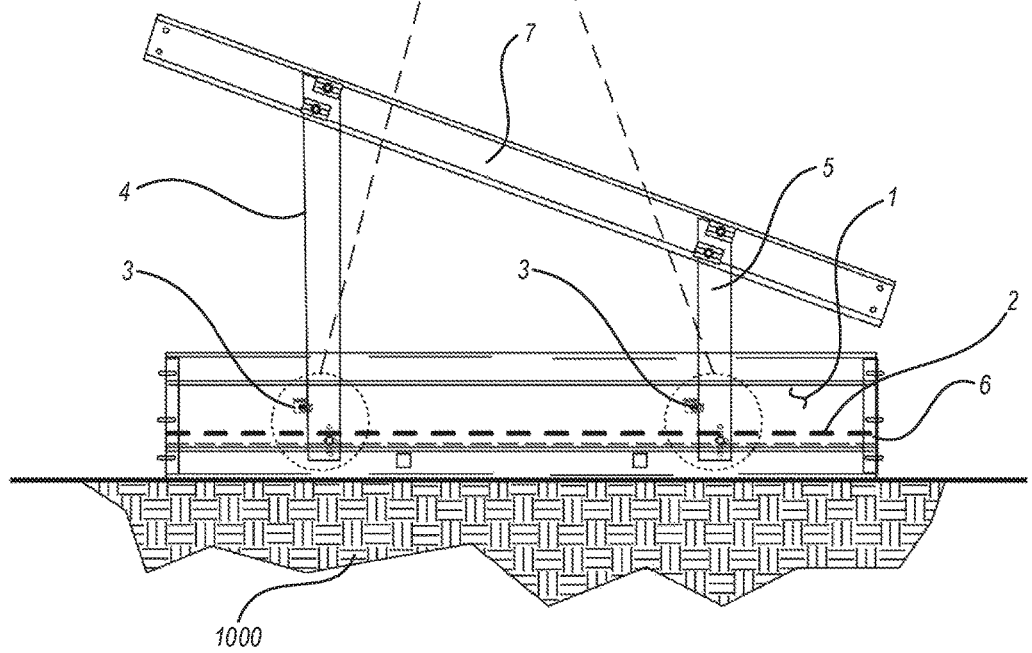
FIG. 8A is a side elevational view of the structure of FIG. 1.
Figure 9:
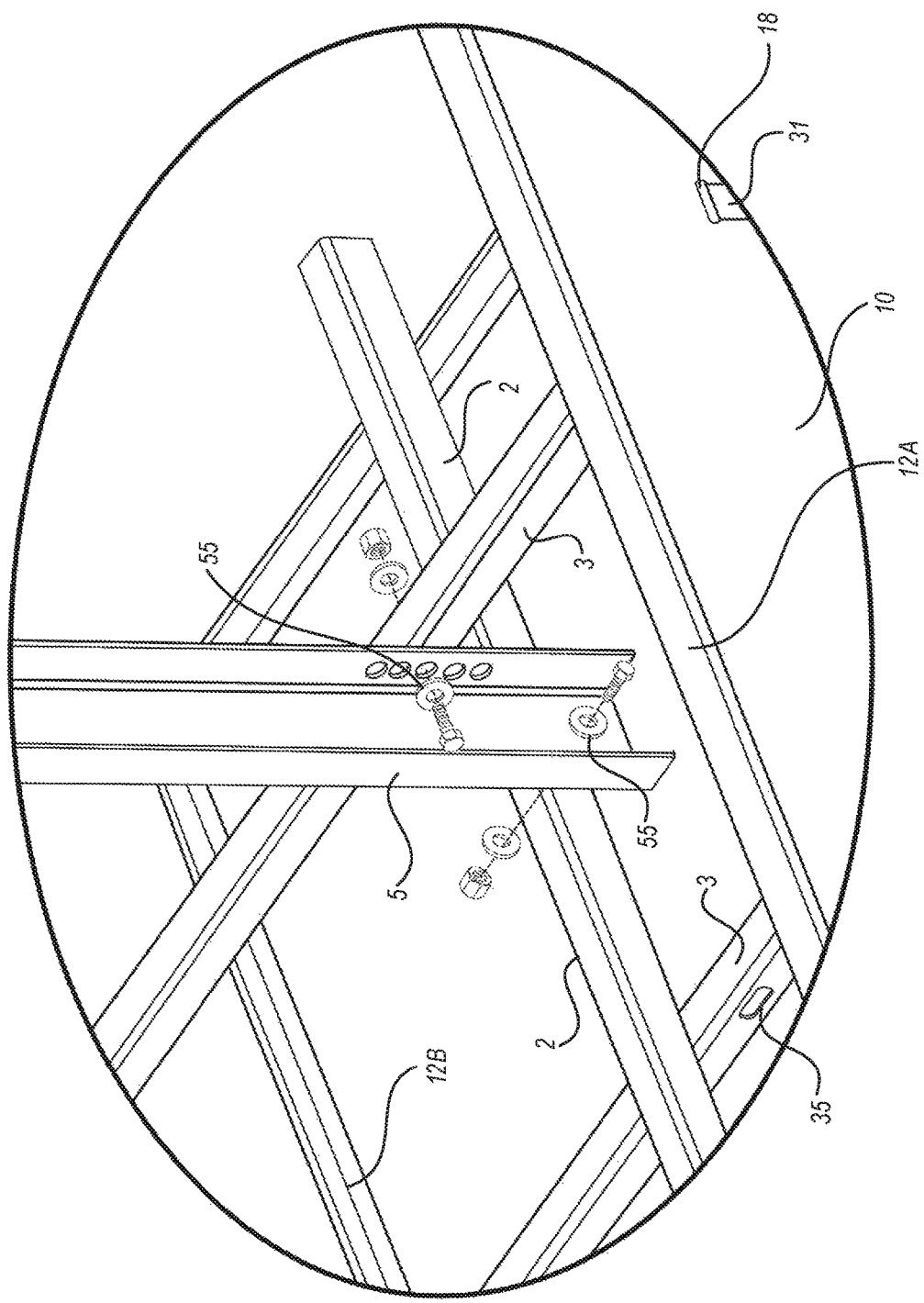
FIG. 9 is a magnified perspective view depicting the interconnections of multiple support pieces from FIG. 8B.

Another key feature of the present invention is the connection arrangement whereby the vertical supports 4, 5 are connected to both the longitudinal cross brace 2 and at least one transverse cross brace 3. This is depicted in the magnified view of FIG. 8B which depicts identical connection arrangements for both the front vertical support 5 and the rear vertical support 4. The interrelationship between the vertical supports 4, 5 and the longitudinal cross brace 2 and at least one transverse cross brace 3 is best depicted in FIG. 9. Because the substrate 1000 may not be level, it is necessary to adjust the rear and front vertical supports 4, 5 so that they are in a proper position to maintain the proper alignment of the structures (solar panel array) to be supported by those vertical supports. This means that before the concrete pour 2000 occurs, the rear and front vertical supports 4, 5 must be adjusted. This requires latitude in the adjustability between the vertical supports 4, 5 and the internal cross bracing 2, 3. This is accomplished through the use of slots, such as 25 in the longitudinal cross brace 2, as depicted in FIG. 8B. There are also slots 35 in the transverse cross braces 3 as seen in FIG. 9. Because of these slots in the cross braces, it is not necessary to have slots in the beams constituting rear and front vertical supports 4, 5.

Figure 12:
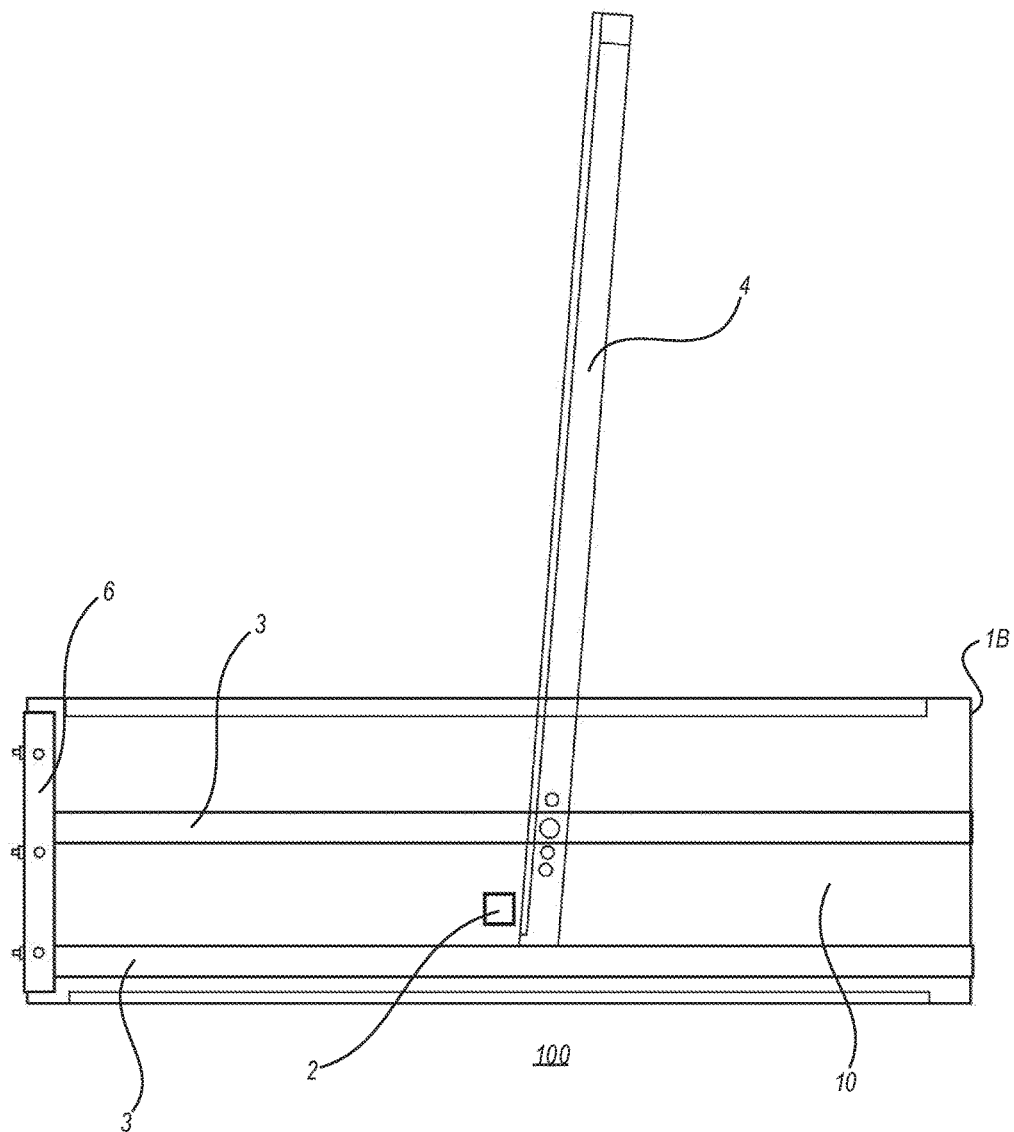
FIG. 12 is an end view of FIG. 11, depicting tolerances in another direction for positioning the vertical supports.

Referring to FIGS. 8B and 9, it is clear that each vertical support 4, 5 is connected to at least the longitudinal cross brace 2 and at least one transverse cross brace 3. This arrangement permits the tilt of each of the rear and front vertical supports 4, 5 to be adjusted in two directions. The amount of tilt in each of the vertical supports 4, 5 in the longitudinal direction is depicted in FIG. 11. The lateral tilt (along a transverse cross brace 3) is depicted in FIG. 12. As stated previously, this is achieved through slots such as 35 (in FIG. 9) and 25 (in FIG. 8B).

Rear and front vertical supports 4, 5 are constituted by U-shaped beams capable of supporting heavy loads such as solar panel arrays. The vertical support beams 4, 5 must be carefully adjusted to the proper angle for a solar panel array. Consequently, the beams constituting the front and rear vertical supports 5, 4 must be held in position in a manner that will allow close adjustment while accommodating the size and weight of those beams. To facilitate this process, resilient washers 55 are used with bolts and nuts to fasten the vertical supports 4, 5 into place. The washers 55 permit a moderately tight connection between the front and rear vertical supports and the longitudinal cross brace and transverse cross braces so that the front and rear vertical supports are maintained in the proper disposition. The use of resilient washers allows sufficient controlled sliding (using slots 25, 35) so that position of the front and rear vertical supports can be subjected to fine adjustment before tightening the fasteners in a permanent connection arrangement.

Once the bolts are thoroughly tightened down, the front and rear vertical supports 5, 4 are secure, and will remain in the proper position during the concrete pour. The advantage of pouring in place is that precise adjustments can be made for the vertical supports extending from the concrete pour to accommodate existing conditions of the substrate 1000.

Further, if necessary, with the present inventive concrete form system 100, an unsuitable substrate surface can be accommodated with sand, gravel, or the like before the concrete pour 2000 is carried out. With the preferred open bottom of the concrete form system 100, better accommodation can be made between the concrete form and an irregular substrate below. The connecting medium is the concrete pour 2000, which holds the form system 100 and the substrate 1000 together by conforming to the shape and contour of the substrate. As depicted in FIG. 6, the transverse edges next to the substrate 1000, along with the lip structures 121A, help hold the form system 100 to the substrate via concrete pour 2000 (which can spread to match the underlying substrate 1000). As a result, the base of the ballast foundation is formed in a manner that will conform to the substrate 1000.

Figure 10:
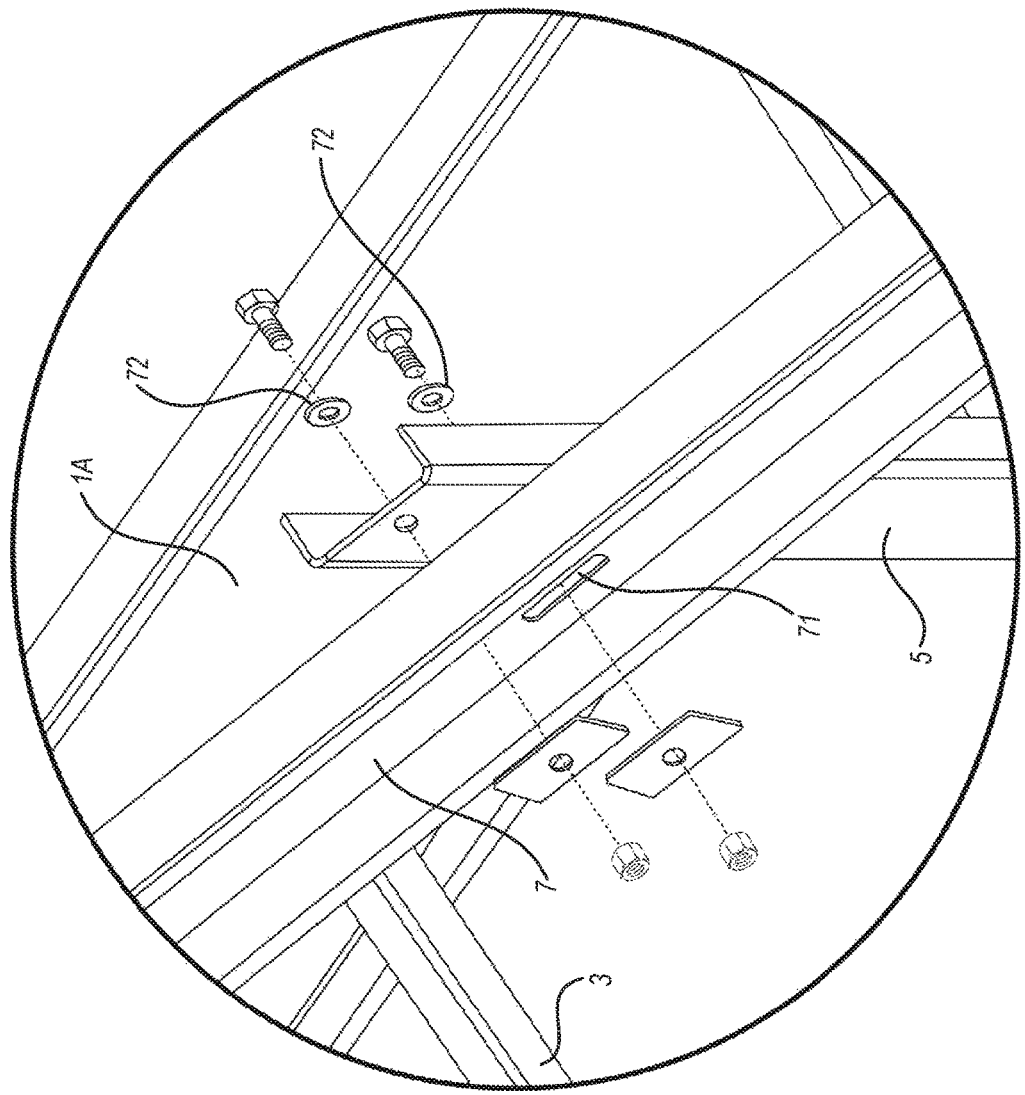
FIG. 10 is a magnified view of the interconnections between a vertical support and a tilt top cord.

Additional adjustments to the front and rear vertical supports 5, 4 can be made before the concrete pour 2000 is carried out. In particular, as depicted in FIG. 10, the upper ends of the front and rear vertical supports 4, 5 can be braced and positioned through the use of tilt top cord 7. Such adjustment is particularly appropriate when the structure to be supported by the ballast foundation is a solar panel array. Adjustment and bracing of the upper ends of the front and rear vertical supports 5, 4 is accomplished using slot 71 in the tilt top cord 7. Preferably, such adjustment takes place before the concrete pour 2000 is carried out. However, because of the flexibility provided by the connection scheme depicted in FIG. 10, such adjustment can be deferred until after the concrete pour 2000 has set. Preferably, the adjustment of the tilt top cord 7 to the front and rear vertical supports 5, 4 is accomplished using nuts and bolts and resilient washers such as 72 (in FIG. 10) to provide a stable connection once the final adjustments have been made.

Yet another advantage of the present system 100 is that form sections 1A, 1B are made from rolled steel in the preferred shape depicted in FIG. 2. The shape of form sections 1A, 1B facilitate easy packaging and shipping, as depicted in the transport configurations of FIGS. 13A-13C. Because these shipping packages are densely constituted (due to the substantially flat nature of form sections 1A, 1B, the shipping process is efficient and cost effective). Still further, because the design of the form sections 1A, 1B facilitate easy packaging and efficient shipment, placement at the job site is much easier.

For assembly, all that needs to be done is for the correct number of form sections 1A, 1B be taken from a truck and placed at the pour site. This is relatively easy due to the substantially flat nature of the form sections 1A, 1B. At the pour site, form sections 1A, 1B are bent at the various scored creases 11, and then complementary form sections are connected together to achieve the preferred configuration as shown in FIG. 1.

As part of the assembly process, knock-out piece 125 is removed from each of the form sections 1A, 1B to provide V-notches 13A, 13B. Easily removable knock-outs 125 are configured as part of the basic manufacturing process. These knock-outs 125 were preferrably kept in place during packing and transport in order to protect transverse edges 12A, 12B and to prevent unwanted bending of the form sections during transport that could weaken the form section. Ribs 17 also help maintain the structural integrity of the form sections 1A, 1B during handling and transport.

A key aspect of the present form system 100 is the overall simplicity and efficiency of all processes from manufacturing, to setting up the form on site, to receiving a concrete pour. To summarize, the entire process is essentially defined by the rolling process for manufacturing a product that is easily stackable for transport. Then, removing only those form sections 1A, 1B needed at a particular pour site, and bending the form sections 1A, 1B (after removing knock-outs 125) so that the form sections can be connected together with corner bracing 6. The next, internal cross braces 2, 3 are easily installed by bending the flanges 21, 31 against the outer sidewalls 10 of the form sections 1A, 1B. Because of the multiple cross braces, alignment and securing of the vertical supports 4, 5 is easily done. This last step provides precise alignment of the vertical supports for the particular substrate at the pour site. Afterwards, the concrete pour 2000 can be made for the form system 100.

Relatively large ballast foundations can be achieved with the present form system 100 since the weight of the concrete pour 2000 is accommodated by the multiple interconnected cross bracing 2, 3, as well as the vertical supports 5, 4, which all provide substantial internal integrity capable of maintaining the sidewall 10 configuration under the force of concrete pour 2000.

While at least one preferred embodiment has been described by way of example, the present inventive form system is not limited thereto. Rather, the present invention should be interpreted to include any and all variations, adaptations, derivations, and embodiments that would occur to one skilled in this art and with a full knowledge with the present invention.

What is claimed is:

1. A ballast foundation system constituted by interacting portable parts configured to a substrate underlying said ballast foundation system, said ballast foundation system comprising:
  a) two folding metallic casing sections arranged together to enclose a space over said substrate, said metallic casing sections being configured in two sets of attached opposing walls;
  b) a bracing configuration internal to said metallic casing sections, said configuration comprising,
    i) at least one longitudinal cross brace locked to a first set of opposing walls;
    ii) a plurality of transverse cross braces, each said transverse cross brace attached to said longitudinal cross brace and locked to a second set of opposing walls; and,
    iii) at least one substantially vertical upright support attached to said longitudinal cross brace and at least one said transverse cross brace; and,
  c) an on-site concrete pour arranged within and contained by said metallic casing sections, said concrete pour conforming to said substrate underlying said ballast foundation system, and rising no higher than a vertical height of said opposing walls of said metallic casing; and, wherein
    said metallic casing sections, said bracing configuration, and said concrete pour form a permanent integrated ballast foundation;
    said attached opposing walls each comprise upper and lower transverse edges;
    lower said transverse edges that are adjacent to said substrate are shaped to contain a portion of said concrete pour, thereby holding said attached opposing walls against said substrate;
    said transverse edges comprise a perpendicular lip extending from each said transverse edge; and,
    said longitudinal cross brace and said transverse cross braces comprise locking tabs to extend through slots in said opposing walls.

2. The ballast foundation system of claim 1, wherein said locking tabs fold over an exterior of said enclosed space formed by said opposing walls.

3. The ballast foundation system of claim 1, wherein said at least one substantially vertical upright support is angularly adjustable with respect to said substrate by means of a connector slot in said longitudinal cross brace.

4. The ballast foundation system of claim 3, further comprising a plurality of substantially vertical upright supports, and external upper support connecting distal ends of said substantially vertical upright supports.

5. The ballast foundation system of claim 1, further comprising corner braces arranged at intersections between said two metallic casing sections.

6. The ballast foundation system of claim 1, further comprising longitudinal ribs on each of said walls of said metallic casing sections.

7. A ballast form to be assembled on-site and placed on a substrate, said ballast form comprising:
   a) two metal sheets each having a length, width, and flat outer-face, each said sheet further including V-notches at opposing ends and at least one crease across the width of each said metal sheet for bending to form an enclosure by connecting both metal sheets on-site for placement over said substrate, said enclosure having first and second sets of parallel sidewalls;
   b) a bracing system inside said formed enclosure, said bracing system comprising,
      i) at least one longitudinal cross brace secured within the enclosure to the first set of parallel sidewalls;
      ii) a plurality of transverse cross braces within the enclosure, each said transverse cross brace being secured to said longitudinal cross brace and the second set of parallel sidewalls; and,
      iii) at least one substantially vertical support within the enclosure attached to said longitudinal and traverse cross braces; and,
   c) concrete contained within the braced enclosure and above said substrate, said concrete having a thickness no greater than the width of said metal sheets; and, wherein
      said two metal sheets, said bracing system and said concrete comprise an integral permanent ballast foundation;
      said two metal sheets comprise upper and lower transverse edges, and further comprise perpendicular lips extending from said transverse edges; and
      said longitudinal cross braces and said transverse cross braces comprise locking tabs extending through complementary slots in said two metal sheets.

8. The ballast form of claim 7, wherein said substantially vertical support is angularly adjustable using a slot in said longitudinal cross brace.

9. The ballast form of claim 8, wherein each of said two metal sheets further comprise at least one longitudinal rib.

10. The ballast form of claim 7, wherein said upper and lower transverse edges comprise a V-shaped removable segment in each said transverse edge at each said crease.

* * * * *